Figure 1:

May 18, 1943. G. T. LATIMER 2,319,409
FLEXIBLE SHAFT
Filed Aug. 3, 1940

Inventor
George T. Latimer,
By Clifton C. Hallowell
Attorney

Patented May 18, 1943

2,319,409

UNITED STATES PATENT OFFICE 2,319,409

FLEXIBLE SHAFT

George T. Latimer, Harrison, N. Y., assignor to The S. S. White Dental Manufacturing Company, a corporation of Pennsylvania Application August 3, 1940, Serial No. 350,419

1 Claim. (Cl. 64—2)

My invention relates particularly to that class of flexible shafts that are fabricated from wire and comprising a plurality of coiled layers, the adjacent layers being coiled in relatively opposite directions, and sometimes referred to as cables, and is especially directed to the type of such flexible shafts that are commonly referred to as remote control shafts.

Flexible shafts have been found to be applicable as a rotary connecting medium between the driving and driven elements in almost innumerable types of mechanism wherein the axes of said driving and driven elements may not conveniently be alined, and in many instances it has been found desirable to employ such shafts in somewhat constricted spaces. This is particularly true in automobile and airplane construction wherein devices such as the radio mechanism, etc. may be so disposed behind the switchboard as to require a limited length of the shaft to assume a bend of very short radius, and thus tend to unduly strain the shaft structure at such restricted region as to tend to render its service of short life.

The principal objects of my invention are to provide a flexible shaft of the type contemplated that may be provided with regions of relatively different flexibility so that the portion where it is desirable that it be operated while curving sharply in an arc of short radius will be fabricated in such manner as to render it relatively flexible as compared with the remainder of said shaft in which a stiffer structure may be better suited to the purpose for which it is intended.

Other objects of my invention are to provide a composite flexible shaft comprising predetermined regions of relatively different flexibility and constituting adjoining sections which embody relatively different characteristics of fabrication, material or dimensions.

Further objects of my invention are to provide a flexible shaft composed of separately fabricated sections of shafting embodying relatively different characteristics and joined together in integral coaxial relation by butt welding to form for all intents and purposes, a unitary shaft structure having regions of relatively different flexibility.

Specifically stated, the form of my invention as hereinafter more definitely described comprises a driving element and a driven element embodied in relatively spaced structures which are so associated as to provide a limited space of such contour as to require the connecting medium to extend in a restricted irregular path, said connecting medium preferably consisting of a flexible shaft which is composed of coiled wire and having integrally joined sections of relative flexibility, the regions of greater flexibility being disposed where said flexible shaft is required to be bent in curves of minimum radius.

My invention also includes all of the various novel features of construction and arrangement as hereinafter more definitely specified.

Figure 2:
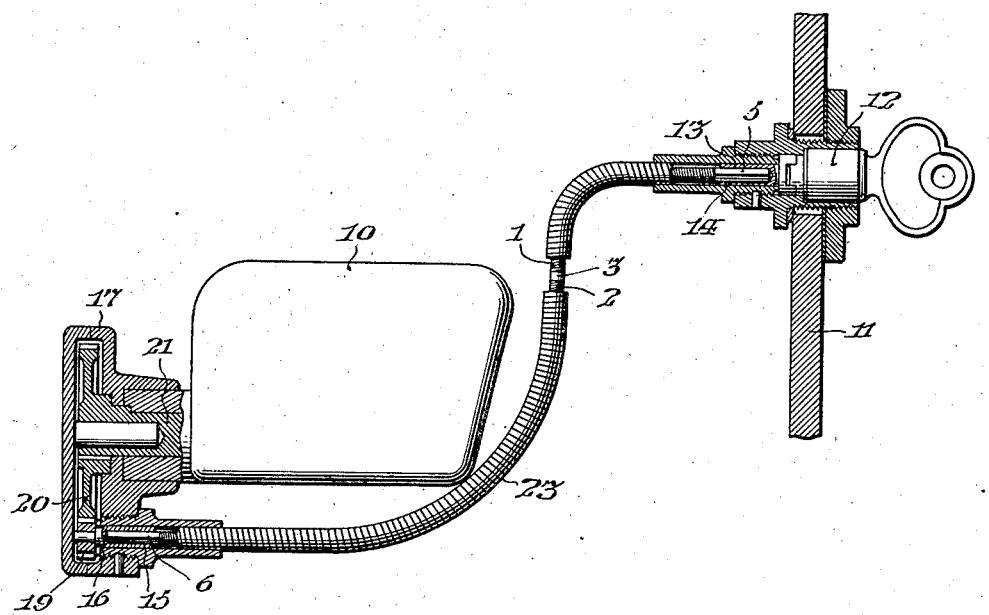

In the accompanying drawing, Figure 1 is a side elevational view of a flexible shaft constructed in accordance with my invention; and Fig. 2 is a vertical sectional view showing certain parts in elevation for convenience of illustration, and illustrating an embodiment of my invention as applied to a switchboard and associated mechanism arranged to be operated by a remote control connector.

In said figures, the flexible shaft as illustrated comprises the relatively flexible sections 1 and 2 poined in integral relatively abutted association in any suitable manner to form a unitary structure, as, for instance, by the butt weld 3, and said shaft may be swaged at its terminal regions to provide the rectangular keys 5 and 6.

The relative flexibility of the section 1 of said shaft illustrated may be accomplished by any of the well known means of producing highly flexible shafting and may have its outer layer of wire coiled in the same direction as the outer layer of wire of the section 2 of said shaft, or the direction of the outer layer of the section 1 may be opposed to the direction of the outer layer of the section 2 of said shaft. They may also be formed of different material and of different diameter if found expedient.

As illustrative of the application to which a composite flexible shaft constructed in accordance with my invention, I have chosen to apply it to structure illustrated in Fig. 2 wherein the housing 10 for any suitably actuated mechanism is located in relatively close proximity to the switchboard 11, in which is mounted a driving element comprising a key actuated cylinder 12 having the inwardly extending projection 13 which is provided with the rectangular key socket 14 arranged to receive the similarly formed rectangular terminal key 5 on the flexible shaft whose terminal key 6 is engaged in the similarly formed key socket 15 in the pinion shaft 16 which is rotatably mounted in the gear casing which projects from the housing 10.

The pinion shaft 16 carries the pinion 19 which is in gear-toothed engagement with the gear 20 whose shaft 21 extends into the housing

10 to effect actuation of operative mechanism that may be therein housed, when the shaft comprising the sections 1 and 2 is rotated in its flexible casing 23.

It will be obvious from an inspection of Fig. 2 of the drawing that a flexible shaft as ordinarily constructed would be unduly strained, as has been found in practice, if rotated while bent in an arc of such short radius as is illustrated at the region adjacent to the key 5 at end connected with the driving element, and it is for this purpose that the composite shaft structure having relatively flexible regions is designed.

My invention is advantageous in that flexible shafts may be formed in accordance with my invention to include relatively abutted sections of relative flexibility so as to provide a shaft having stiffness where stiffness may be found desirable in its operation, and having one or more regions of relatively short regions of relative flexibility where such flexibility may be found to be a requisite to its satisfactory operation.

Although I have described the shaft as formed of sections of relative flexibility as being butt welded, it is to be understood that any of the well known forms of connecting means, such as arc welding, resistance welding, torch welding, silver soldering, soft soldering, brazing, etc. may be employed with relative facility, and therefore, I do not desire to limit my invention to the precise details of construction and arrangement as herein set forth, as it is obvious that various modifications may be made therein without departing from the essential features of my invention as defined in the appended claim.

Having thus described my invention, I claim:

The combination with a driving element, of a driven element, and a flexible shaft having distinct regions arranged to be flexed respectively into relatively short and long radii, operatively connecting said elements, and composed of relatively flexible sections each formed of layers of coiled wire alternately wound in opposite directions and joined together in abutted relation to provide a unitary shaft structure of substantially uniform diameter.

GEORGE T. LATIMER.